United States Patent
Nishimura et al.

(10) Patent No.: US 7,848,274 B2
(45) Date of Patent: Dec. 7, 2010

(54) CONTENT DISTRIBUTION METHOD AND RELAY APPARATUS

(75) Inventors: Issei Nishimura, Yokohama (JP);
Makoto Hasegawa, Tokyo (JP);
Yuichiro Kohashi, Tokyo (JP);
Takanobu Nakamura, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 521 days.

(21) Appl. No.: 11/344,995

(22) Filed: Feb. 1, 2006

(65) Prior Publication Data

US 2006/0248168 A1 Nov. 2, 2006

(30) Foreign Application Priority Data

Feb. 2, 2005 (JP) ............................. 2005-026913
Dec. 6, 2005 (JP) ............................. 2005-352453

(51) Int. Cl.
*H04B 7/14* (2006.01)
*H04B 3/36* (2006.01)

(52) U.S. Cl. .............................. 370/315; 375/211; 455/7

(58) Field of Classification Search ................. 370/315, 370/324, 326
See application file for complete search history.

(56) References Cited

U.S. PATENT DOCUMENTS

| | | | | |
|---|---|---|---|---|
| 5,742,402 A | * | 4/1998 | Kobayashi et al. | 358/404 |
| 7,068,655 B2 | * | 6/2006 | March et al. | 370/392 |
| 7,380,273 B2 | * | 5/2008 | Coley et al. | 726/12 |
| 7,577,273 B2 | * | 8/2009 | Rhoads et al. | 382/100 |
| 2002/0035595 A1 | * | 3/2002 | Yen et al. | 709/203 |
| 2003/0007486 A1 | | 1/2003 | March et al. | |
| 2003/0108022 A1 | | 6/2003 | Yamamoto | |
| 2003/0172163 A1 | * | 9/2003 | Fujita et al. | 709/226 |
| 2005/0050211 A1 | | 3/2005 | Kaul et al. | |

FOREIGN PATENT DOCUMENTS

| | | |
|---|---|---|
| EP | 1 385 323 | 1/2004 |
| EP | 1 392 027 | 2/2004 |
| EP | 1 499 099 | 1/2005 |
| EP | 1499099 A1 | 1/2005 |

(Continued)

OTHER PUBLICATIONS

European Search Report dated May 3, 2006.

(Continued)

*Primary Examiner*—Charles N Appiah
*Assistant Examiner*—Emem Stephen
(74) *Attorney, Agent, or Firm*—Brinks Hofer Gilson & Lione

(57) ABSTRACT

A relay apparatus 30 issues a new sub-address at a timing when mobile phones (10a, 10b) requested content from a CP server apparatuses (20a, 20b), that is, at a timing when a sub-address is required. The content specified by this sub-address is distributed from the CP server apparatuses via the relay apparatus (30) to the mobile phones. In system of the present invention it is possible to utilize the same sub-address many times for different content items. It is therefore possible to avoid increasing the number of digits of the sub-address as well as the complexity of the sub-address structure, in a case where the types of content or the number of content items increases.

15 Claims, 10 Drawing Sheets

FOREIGN PATENT DOCUMENTS

| | | |
|---|---|---|
| JP | 5-219225 A | 8/1993 |
| JP | 8-265434 A | 10/1996 |
| JP | 10-304077 | 11/1998 |
| JP | 2001-312639 | 11/2001 |
| JP | 2001-331387 A | 11/2001 |
| JP | 2002-359687 | 12/2002 |
| JP | 2003-37836 | 2/2003 |
| JP | 2003-348282 A | 12/2003 |
| JP | 2004-240641 | 8/2004 |
| JP | 2004-356897 | 12/2004 |

OTHER PUBLICATIONS

Japanese Office Action issued Jan. 27, 2009 in Japanese patent application No. 2005-352453 (with translation), total 7 pages.

Taiwanese Office Action issued Feb. 18, 2009 in Taiwanese patent application No. 95103799 (with translation), total 21 pages.

Japanese Office Action issued Oct. 20, 2009 in Japanese patent application No. 2005-352453 (with English translation), 4 pages.

* cited by examiner

FIG. 3

| URL | SUB-ADDRESS | ISSUE DATE AND TIME |
|---|---|---|
| http://www.xxx.co.jp/actionA.mp4 | 91111 | 2004/10/10 10:00 |
| | 91212 | 2004/10/11 10:15 |
| | 91555 | 2004/10/12 10:21 |
| | 91900 | 2004/10/13 10:30 |
| | ... | ... |
| | NOT YET ISSUED | — |
| | NOT YET ISSUED | — |
| http://www.xxx.co.jp/actionB.mp4 | 90002 | 2004/10/10 12:31 |
| | 91895 | 2004/10/11 12:40 |
| | 95232 | 2004/10/12 12:50 |
| | 94545 | 2004/10/13 12:55 |
| | 98120 | 2004/10/14 13:00 |
| | ... | ... |
| | ... | ... |
| | 93285 | 2004/10/10 19:20 |
| http://www.xxx.co.jp/actionC.mp4 | NOT YET ISSUED | — |
| | NOT YET ISSUED | — |
| | NOT YET ISSUED | — |
| | NOT YET ISSUED | — |
| | NOT YET ISSUED | — |
| | NOT YET ISSUED | — |
| | NOT YET ISSUED | — |
| | NOT YET ISSUED | — |
| ⋮ | ⋮ | ⋮ |

FIG. 6

MOVIE DISTRIBUTION SITE

IF YOU WANT TO SEE THE ACTION SCENES OF THE MOVIE "XXX", CLICK THE LINK BELOW TO ISSUE A SUB-ADDRESS.

"ACTION A"
"ACTION B"
"ACTION C"

FIG. 7

MOVIE DISTRIBUTION SITE

A SUB-ADDRESS HAS BEEN ISSUED. CLICK ON THE LINK BELOW FOR VIDEOPHONE CALL.

"PLAY"

US 7,848,274 B2

CONTENT DISTRIBUTION METHOD AND RELAY APPARATUS

This application claims priority under 35 U.S.C. §119 to Japanese Patent Application Nos. 2005-026913 filed Feb. 2, 2005 and 2005-352453 filed Dec. 6, 2005, the entire contents of which are hereby incorporated herein by reference.

BACKGROUND OF THE INVENTION

1. Field Of The Invention

The present invention relates to technology for distributing video and/or audio content from a server apparatus via a relay apparatus to a telephone.

2. Description Of The Related Art

Services for distributing video and/or audio content to mobile phones by streaming have been proposed (see JP 2003-037836A, for example). "Streaming" means distribution in which the mobile phone serving as the client can reproduce the content simultaneously while receiving it. The advantage of streaming is that the user does not have to wait until the download of the whole content is finished since the client reproduces a part of the content that has already been received while receiving subsequent parts of the content.

In services that are already implemented, streaming content distribution is accomplished by the following procedure.

In FIG. 13, a mobile phone 1b that is part of a mobile phone network 1a can realize a videophone function by using a videophone protocol. By operating the mobile phone 1b, the user first enters a telephone number that is assigned to a relay apparatus 1c and then enters a character string of several digits to specify the content. This character string is referred to as a "sub-address". This sub-address is stored in advance in the relay apparatus 1c in association with a content ID. In the example shown in FIG. 13, the content to which the content ID "C0001" has been assigned is specified by the sub-address "90001."

Now let us examine the case that a call-connection signal including, for example, the number "*8608*90001" is sent from the mobile phone 1b. In this number "*8608*90001", the initial "*" is a predetermined prefix, and the following "8608" is a shortened telephone number referred to as "special number". The following "*" is referred to as a separator, and the final "90001" is the sub-address. Based on the telephone number (special number) "8608" sent from the mobile phone 1b, a telephone connection between the mobile phone 1b and the relay apparatus 1c is established, and the sub-address "90001" is notified to the relay apparatus 1c. The content ID "C0001" corresponding to the sub-address "90001" that has been notified to the relay apparatus 1c is notified to a CP server apparatus 1d, and the content corresponding to this ID is obtained from the CP server apparatus 1d. Then, the relay apparatus 1c sends the obtained content by videophone protocol to the mobile phone 1b. When the mobile phone 1b receives the content, it successively reproduces the content.

The above-noted correspondence between the sub-address and the content ID is set in advance by the content provider, who manages the CP server apparatus 1d, and the network provider, who manages the mobile phone network 1a and the relay apparatus 1c. That is to say, since the correspondence between the sub-address and the content ID is fixed through an agreement between those two parties, when the number of content items increases due to an increase in the number of content providers, then the number of sub-addresses has to be increased by the same amount. In the example in FIG. 13 for example, only a four-digit numeric string "xxxx" (where x is an arbitrary numeral) is provided as a valid address in the five-digit sub-address "9xxx", so that the number of content items that can be designated with this system of sub-addresses is limited to 9999 at the most.

Consequently, if the number of content items is increased beyond that, then this must be accommodated by increasing the number of digits of the sub-address or by making the configuration of the sub-address more complicated. However, the operation burden on the user is smaller if the sub-address is a simple character string that is as short as possible, so that there is a need for way to accommodate an increase in the number of content items without increasing the number of digits of the sub-address and without making the configuration of the sub-address more complicated.

SUMMARY OF THE INVENTION

It is an object of the present invention to provide an approach that makes it possible to avoid an increase in the number of digits of the sub-address as well as a complication of the sub-address configuration when there is an increase in types of content or number of content items, in the case that the content to be distributed to a mobile phone is specified through use of a sub-address used by appending it to a telephone number.

In order to attain this object, in accordance with an aspect of the present invention, a content distribution method in a system provided with a telephone, a relay apparatus and a server apparatus, includes a step in which the telephone requests content comprising at least one of video and audio from the server apparatus; a step in which the server apparatus notifies the relay apparatus of a communication address indicating a storage location of the content; a step in which the relay apparatus issues a sub-address for specifying the content and stores that sub-address in association with the notified communication address; a step in which the relay apparatus notifies the server apparatus of the issued sub-address; a step in which the server apparatus notifies the telephone of the sub-address that has been notified by the relay apparatus; a step in which the telephone sends a call-connection signal including a telephone number assigned to the relay apparatus and the sub-address notified by the server apparatus, using a videophone protocol for sending and receiving video and audio in synchronization; a step in which the relay apparatus receives the call-connection signal and obtains a content from the server apparatus using the communication address stored in association with the sub-address included in that call-connection signal; and a step in which the relay apparatus sends the obtained content by videophone protocol to the telephone. With this content distribution method, a content distribution service can be implemented in which a new sub-address is issued and the content specified by this sub-address is distributed at a timing when the telephone requests a content from the server apparatus, that is, at a timing when the sub-address becomes necessary. Thus, the sub-addresses are not assigned in a fixed manner in advance to the all content items, but the sub-addresses are only issued every time that a content is requested, so that it is possible to process only the content that seems to have a high priority for the user of the telephone. Thus, it is possible to utilize all sub-addresses effectively, and to avoid an increase in the number of digits of the sub-address as well as a complication of the configuration of sub-addresses, even when there is an increase in types of content or number of content items.

In accordance with another aspect of the present invention, a content distribution method in a system provided with a telephone, a relay apparatus and a server apparatus, includes a step in which the telephone requests a content comprising at least one of video and audio; a step in which the relay apparatus issues a sub-address for specifying the content and stores that sub-address in association with a communication address indicating a storage location of the content; a step in which the relay apparatus notifies the telephone of the issued sub-address; a step in which the telephone sends a call-connection signal including a telephone number assigned to the relay apparatus and the sub-address notified by the relay apparatus, using a videophone protocol for sending and receiving video and audio in synchronization; a step in which the relay apparatus receives the call-connection signal and obtains a content from the server apparatus using the communication address stored in association with the sub-address included in that call-connection signal; and a step in which the relay apparatus sends the obtained content by videophone protocol to the telephone. With this content distribution method, a content distribution service can be implemented in which a new sub-address is issued and the content specified by this sub-address is distributed at a timing when the telephone requests content from the server apparatus, that is, at a timing when the sub-address becomes necessary. Thus, the sub-addresses are not assigned in a fixed manner in advance to the all content items, but the sub-addresses are only issued every time that a content is requested, so that it is possible to process only the content that seems to have a high priority for the user of the telephone. Thus, it is possible to utilize all sub-addresses effectively, and to avoid an increase in the number of digits of the sub-address as well as a complication of the configuration, even when there is an increase in types of content or number of content items.

In accordance with another aspect of the present invention, a relay apparatus includes a videophone unit for performing communication with a telephone using a videophone protocol for sending and receiving video and audio in synchronization; a communication unit for performing data communication with a server apparatus; a sub-address issuing unit for issuing a sub-address for specifying a content including at least one of video and audio; a storage unit which, when the communication unit receives a communication address from the server apparatus, stores the sub-address issued by the sub-address issuing unit in association with the received communication address; a notification unit for notifying the server apparatus with the communication unit of the sub-address that has been issued by the sub-address issuing unit; an access control unit which, when the videophone unit receives a call-connection signal including the sub-address, causes the communication unit access the server apparatus using the communication address stored in association with the sub-address; and a send control unit for sending, with the videophone unit, a content that the communication unit has received from the server apparatus to the telephone.

In accordance with another aspect of the present invention, a relay apparatus includes a videophone unit for performing communication with a telephone using a videophone protocol for sending and receiving video and audio in synchronization; a communication unit for performing data communication with a server apparatus; a sub-address issuing unit for issuing a sub-address for specifying a content including at least one of video and audio; a storage unit which, when the communication unit receives a request for a content from the telephone, stores the sub-address issued by the sub-address issuing unit in association with a communication address indicating the storage location of that content; a notification unit for notifying the telephone with the communication unit of the sub-address that has been issued by the sub-address issuing unit; an access control unit which, when the videophone unit receives a call-connection signal including the sub-address, causes the communication unit access the server apparatus using the communication address stored in association with the sub-address; and a send control unit for sending, with the videophone unit, a content that the communication unit has received from the server apparatus to the telephone.

In a preferable embodiment of the present invention, the relay apparatus further includes a judgment unit for judging whether the sub-address included in the call-connection signal received by the videophone unit is within a period of validity or not; wherein, if the sub-address is within the period of validity, the access control unit causes the communication unit access the server apparatus using the communication address stored in association with that sub-address. In this embodiment, it is possible to utilize the same sub-address multiple times for different content items. Thus, it is possible to avoid increasing the number of digits of the sub-address or complicating the configuration, even when the number of content types or content items increases.

It is also possible that the relay apparatus further includes an upper limit storage unit for storing an upper limit of the number of sub-addresses that can be issued for one communication address; wherein the sub-address issuing unit issues sub-addresses up to the upper limit stored in the upper limit storage unit. In this embodiment, it is possible to avoid that too many sub-addresses are issued for one communication address.

It is also possible to further provide a count unit for counting the number of accesses to each of the communication addresses; and an upper limit changing unit for changing, in accordance with the number of accesses that are counted, the upper limit stored for each of the communication addresses by the upper limit storage unit. In this embodiment, it becomes possible to issue sub-addresses in accordance with the access situation, such as to raise the upper limit for communication addresses with a high number of accesses and to lower the upper limit for communication addresses with a low number of accesses.

BRIEF DESCRIPTION OF DRAWINGS

FIG. 3 is a diagram showing an example of an address conversion table that is stored by the relay apparatus of this embodiment.

FIG. 6 is a drawing showing an example of a menu screen displayed by a mobile phone according to this embodiment.

FIG. 7 is a drawing showing an example of a screen displayed by a mobile phone according to this embodiment.

DESCRIPTION OF THE PREFERRED EMBODIMENTS

The following is an explanation of preferred embodiments for implementing the present invention.

In the following explanations, "videophone" means a service or function with which a user of the sender and a user of the receiver communicate in real-time while seeing each other's picture. The videophone protocol used for videophones is a communication protocol for exchanging video and audio in synchronization with the other party.

(1) First Embodiment (1-1) Configuration

Figure 1:
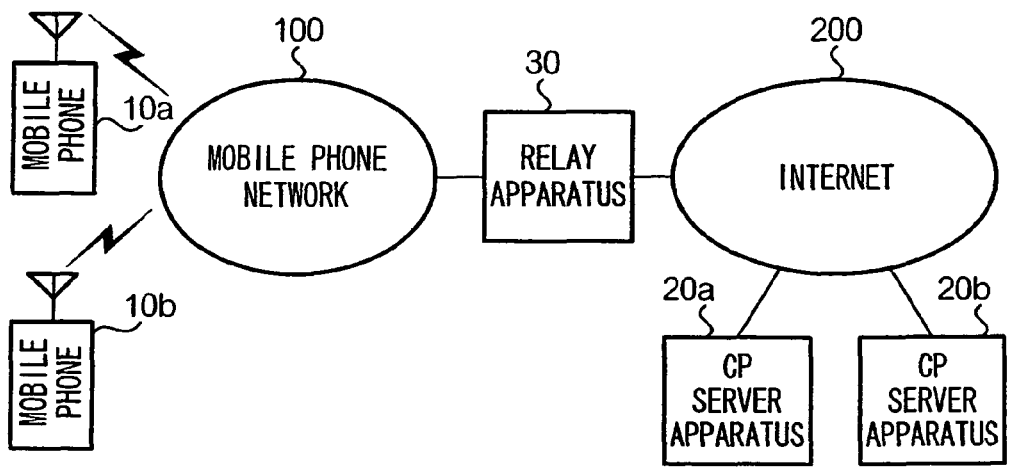
FIG. 1 is a block diagram showing the overall configuration of a system according to a first embodiment of the present invention.

FIG. 1 is a block diagram showing the overall configuration of a content distribution system according to the first embodiment. In FIG. 1, a mobile phone network 100 is constituted by communications equipment of the IMT-2000 (International Mobile Telecommunications-2000) standard, for example. The IMT-2000 standard is able to realize high-speed data communication of about several hundred kbps to several Mbps. Since such high-speed data communication is possible, the mobile phones 10a and 10b served in the mobile phone network 100 can realize a videophone function by use of the videophone protocol. Moreover, the mobile phones 10a and 10b store a WWW browser program, and through execution of the same, they can interpret screen data in HTML (Hypertext Markup Language) format obtained from the WWW (World Wide Web) and display various kinds of dialogue screens on a display.

CP (Content Provider) server apparatuses 20a and 20b are connected to the Internet 200. The CP server apparatus 20a are WWW (World Wide Web) server apparatuses that are capable of streaming distribution using HTTP (Hypertext Transfer Protocol), and the CP server apparatus 20b is a streaming server apparatus that performs streaming distribution using RTSP (Real Time Streaming Protocol). Both the CP server apparatuses 20a and 20b are provided with a function for distributing video and/or audio content by pseudo-streaming to the mobile phones 10a and 10b.

The relay apparatus 30 is connected to both the mobile phone network 100 and to the Internet 200. The relay apparatus 30 is provided with a function for relaying data communication between the mobile phones 10a, 10b and the CP server apparatuses 20a and 20b. Furthermore, the relay apparatus 30 stores sub-addresses for specifying a content in association with communication addresses (URLs: Uniform Resource Locators) on the Internet indicating the storage location of the content. The relay apparatus 30 converts the sub-address included in a call-connection signal sent from the mobile phones 10a and 10b into a URL, and obtains a content through HTTP from the CP server apparatuses 20a and 20b using this URL. Then, the relay apparatus 30 sends the obtained content to the mobile phones 10a and 10b using the videophone protocol. That is to say, the mobile phones 10a and 10b obtain a content from the CP server apparatuses 20a and 20b via the relay apparatus 30.

The foregoing is an explanation of the configuration of the overall system. It should be noted that only two mobile phones and two CP server apparatuses are illustrated in FIG. 1, in order to avoid the drawing from becoming too complicated, but in practice, there may be more than two each.

Figure 2:
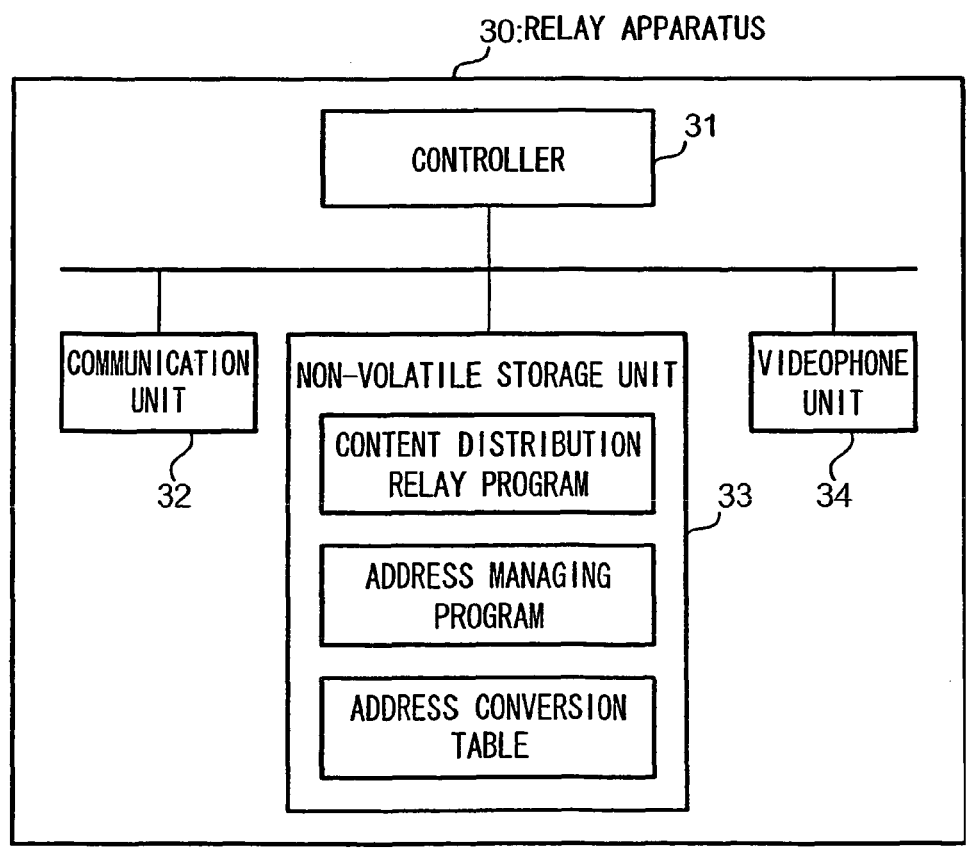
FIG. 2 is a block diagram showing the configuration of a relay device in this embodiment.

Referring to FIG. 2, the following is an explanation of the configuration of the relay apparatus 30. A controller 31 shown in FIG. 2 is provided with a calculation device, such as a CPU, and memory devices, such as a ROM and a RAM. The controller 31 controls all parts of the relay apparatus 30 by reading and executing a computer program that is stored in one of those memories or in a non-volatile storage unit 33. A communication unit 32 is connected to the mobile phone network 100 and to the Internet 200, and relays data communication between the mobile phones 10a, 10b and the CP server apparatuses 20a, 20b, under control of the controller 31. A videophone unit 34 is connected to the mobile phone network 100 and communicates with the mobile phones 10a and 10b using the videophone protocol.

The non-volatile storage unit 33 is a mass-storage apparatus, such as a hard disk, for example. This non-volatile storage unit 33 stores various kinds of computer programs, such as a content distribution relay program and an address management program, as well as an address conversion table for converting sub-addresses into URLs. The non-volatile storage unit 33 further stores various kinds of screen data expressed in HTML. The screen data are used when issuing a sub-address, and include for example screen data that are generated on a case-by-case basis by a CGI (common gateway interface).

FIG. 3 is a diagram showing an example of the content of the address conversion table. In the example shown in FIG. 3, a plurality of sub-addresses "91111", "91212", "91555", "91900", . . . are assigned to the content stored at the URL "http://www.xxx.co.jp/actionA.mp4", for example. The reason why a plurality of sub-addresses are assigned to a single URL is that a new sub-address is assigned every time when a content from a given URL is desired by a plurality of mobile phones 10a, 10b. For example, when there is a request for distribution of the content of the URL "http://www.xxx.co.jp/actionA.mp4" from the mobile phone 10a, the controller 31 assigns the sub-address "91111", and when there is a request for distribution of the content of the URL "http://www.xxx-.co.jp/actionA.mp4" from another mobile phone 10b, the controller 31 assigns a new sub-address "91212" different to the sub-address "91111". Furthermore, FIG. 3 shows an example in which not even one sub-address has been assigned for the content stored at the URL "http://www.xxx.co.jp/actionC.mp4", for example.

Moreover, the address conversion table further contains the dates and times when the controller 31 has issued the sub-addresses. Each of the sub-addresses is provided with a period of validity, and in the present embodiment, this period of validity is 10 min from the time when the sub-address has been issued. The period of validity is stored in advance in the non-volatile storage unit 33. As long as a sub-address is within its period of validity, the relay apparatus 30 will obtain a content using the URL associated with this sub-address, but when the period of validity has expired, it will not obtain that content and will notify the mobile phone of this. Moreover, also an upper limit of sub-addresses that can be issued for one URL is set in advance. In the present embodiment, the upper limit is 100. The upper limit is stored in advance in the non-volatile memory 33, and the controller 31 within this range issues sub-addresses.

Figure 4:
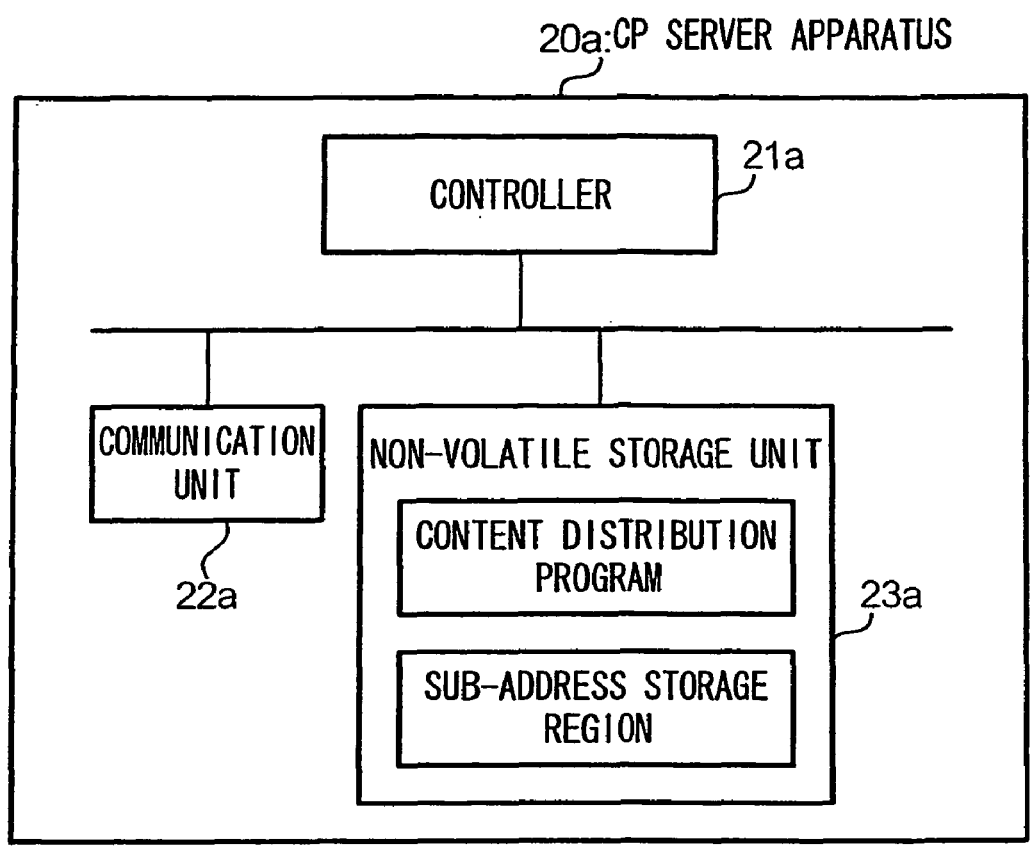
FIG. 4 is a block diagram showing the configuration of a CP server apparatus according to this embodiment.

FIG. 4 is a block diagram showing the configuration of the CP server apparatus 20a. A controller 21a is provided with a calculation device, such as a CPU, and memory devices, such as a ROM and a RAM. The controller 21a controls all parts of the CP server apparatus 20a by reading and executing a computer program that is stored in one of those memories or in a non-volatile storage unit 23a. A communication unit 22a is connected to the Internet 200 and communicates under control of the controller 21 a. The non-volatile storage unit 23a is a mass-storage apparatus, such as a hard disk, for example. This non-volatile storage unit 23a stores a content and a content distribution program, and is furthermore provided with a sub-address storage region for storing the sub-addresses assigned to its own content. The non-volatile storage unit 23a also stores various kinds of screen data expressed in HTML.

It should be noted that also the configuration of the CP server apparatus 20b is substantially the same as described above, so that further detailed explanations have been omitted.

(1-2) Operation

Figure 5:
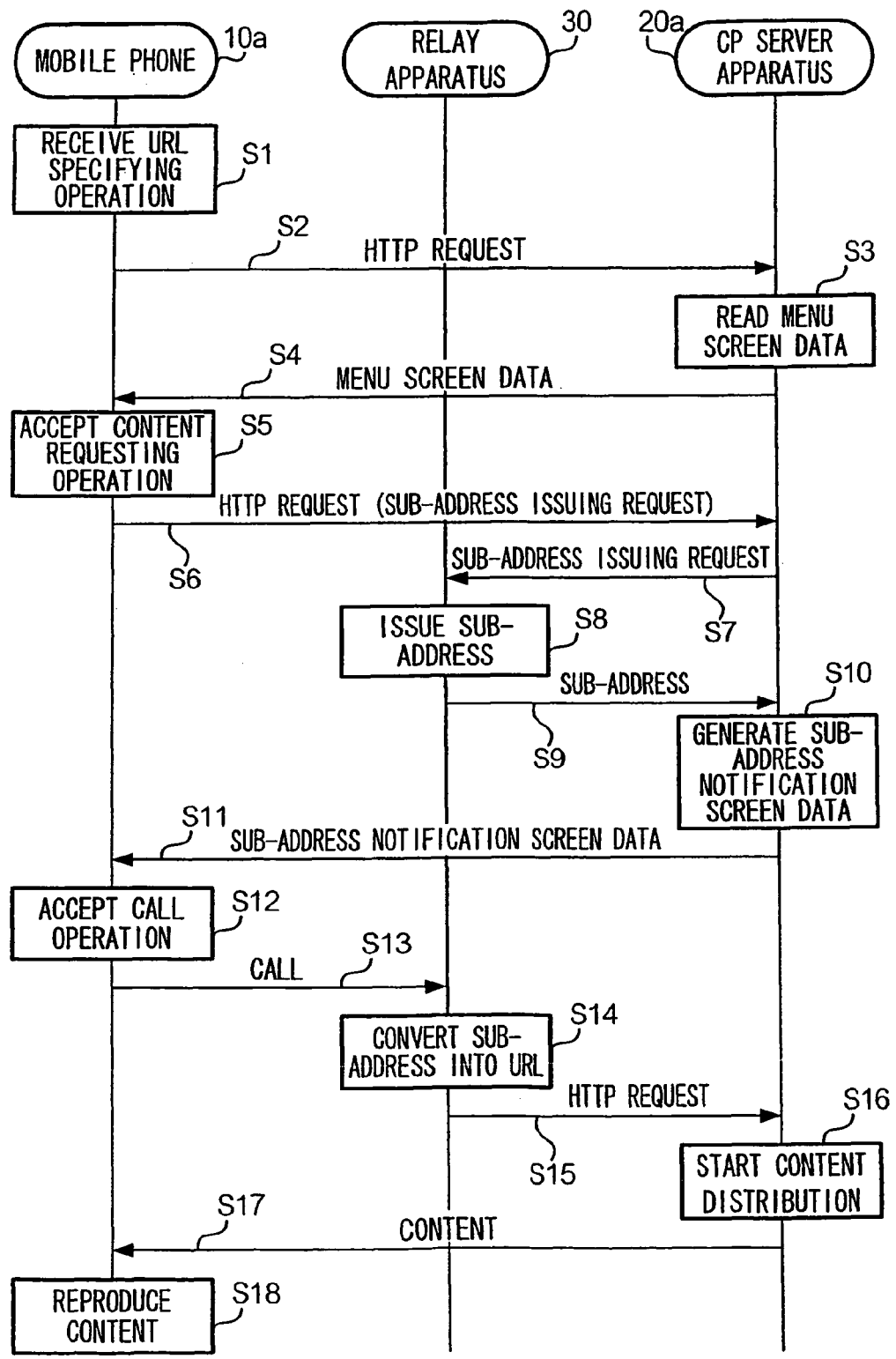
FIG. 5 is a sequence diagram showing the operation of the overall system according to this embodiment.

Referring to the procedure shown in FIG. 5, the following is an explanation of an operation example for the case that a content is requested by the mobile phone 10a from the CP server apparatus 20a. In the following explanations, it is assumed that the telephone number (special number) assigned to the videophone unit 34 of the relay apparatus 30 is "8608", and the correlation between sub-addresses and URLs is as shown in FIG. 3.

In FIG. 5, when the user performs a predetermined operation for specifying a URL using an operation panel of the mobile phone 10a, the mobile phone 10a starts a WWW browser program in response to this operation (Step S1), and sends an HTTP request including this URL (Step S2). This URL is the URL indicating the storage location of the menu screen data stored by the CP server apparatus 20a. When the communication unit 22a of the CP server apparatus 20a receives this HTTP request via the relay apparatus 30, the controller 21a of the CP server apparatus 20a reads the menu screen data in HTML format from the non-volatile storage unit 23a (Step S3), and sends it as an HTTP response to the mobile phone 10a (Step S4).

When the mobile phone 10a receives the menu screen data, it interprets this data and displays it on the display. FIG. 6 is a display example. The character strings "Action A", "Action B" and "Action C" are associated with URLs indicating the storage locations of the respective content items through HTML anchor tags. When the user of the mobile phone 10a performs an operation of selecting the character string "Action A" shown in FIG. 6, then the mobile phone 10a accepts this operation as a content request operation (Step S5), and sends an HTTP request including the associated URL as a sub-address issuing request (Step S6). In the following description, a URL http://www.xxx.co.jp/action-A.mp4 should be included in the request.

When the communication unit 22a of the CP server apparatus 20a receives this HTTP request, the controller 21 a sends an issue request message for requesting the issuing of a sub-address to the relay apparatus 30 (Step S7). This issue request message includes the above-noted URL "http://www.xxx.co.jp/actionA.mp4". When the communication unit 32 of the relay apparatus 30 receives this issue request message, the controller 31 writes the URL "http://www.xxx.co.jp/actionA.mp4" included in this message into the address conversion table, and writes the sub-address "91111" issued in accordance with a predetermined algorithm together with the issue time "2004/10/10 10:00" into the address conversion table in association with this URL (Step S8).

It should be noted that if the URL "http://www.xxx.co.jp/actionA.mp4" has already been written into the address conversion table, then the controller 31 only need to write the issued sub-address together with the issue time in association with this URL.

Furthermore, in this case, if there is a sub-address whose period of validity has expired, then the controller 31 deletes this sub-address from the address conversion table. Deleted sub-addresses are turned into a state in which they can be used as unissued sub-addresses for other URLs. It should be noted, however, that it is also possible that the controller 31 does not immediately delete sub-addresses whose period of validity has expired, but giving consideration to the possibility that there is a delay in the connection processing, after deleting the sub-addresses from the address conversion table, reverts those sub-addresses for example only after 5 minutes to the unissued state.

If the upper limit of 100 sub-addresses has already been issued to the URL "http://www.xxx.co.jp/actionA.mp4" and if all these sub-addresses are within the period of validity, then the controller 31 notifies the CP server apparatus 20a of the fact that no sub-address can be issued.

Then, the controller 31 of the relay apparatus 30 sends the issued sub-address from the communication unit 32 to the CP server apparatus 20a (Step S9). When the controller 21 a of the CP server apparatus 20a receives the sub-address, it writes this sub-address into the sub-address storage region. Then, the controller 21 a generates sub-address notification screen data including this sub-address (Step S10), and sends this data as an HTTP response from the communication unit 22a to the mobile phone 10a (Step S11).

Figure 8:
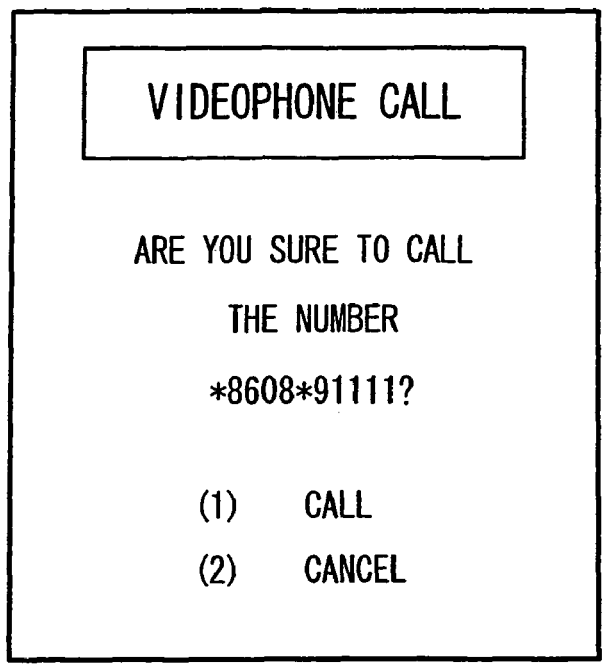
FIG. 8 is a drawing showing an example of a screen displayed by a mobile phone according to this embodiment.

When the mobile phone 10a receives the sub-address notification screen data, it interprets this data and displays it on the display. FIG. 7 is a display example. The character string "play" in FIG. 7 is associated with the telephone number and sub-address "*8608*91111". When the user of the mobile phone 10a selects the character string "play", the mobile phone 10a urges the user to decide whether to call "*8608*91111", and displays a telephone call screen as shown in FIG. 8. When the user of the mobile phone 10a selects the character string "(1) call" shown in FIG. 8, the mobile phone 10a receives this call operation (Step S12), and sends the associated call connection signal "*8608*91111" (Step S13).

Figure 9:
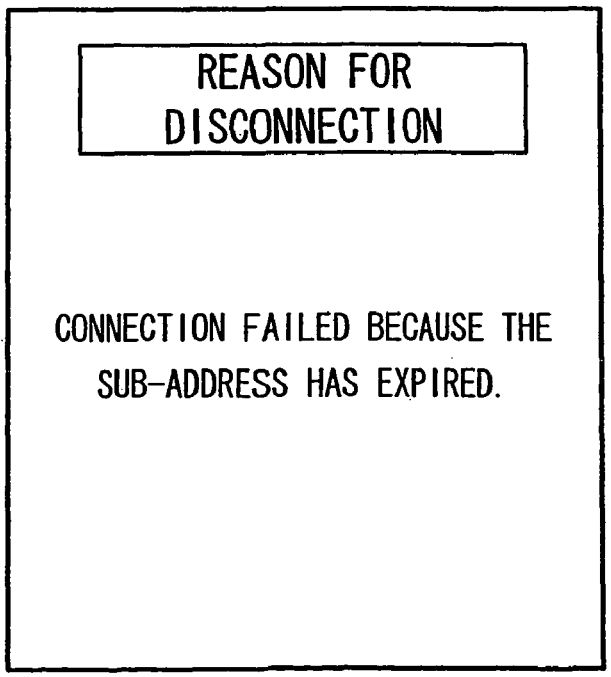
FIG. 9 is a drawing showing an example of a screen displayed by a mobile phone according to this embodiment.

A switching center provided in the mobile phone network 100 converts the telephone number (special number) "8608" included in the call connection number into the correct telephone number, and using this, calls the videophone unit 34 of the relay apparatus 30. During this call, the sub-address "91111" is sent from the switchboard to the relay apparatus 30. Then, the controller 31 of the relay apparatus 30 searches the address conversion table of the non-volatile storage unit 33, and obtains the URL "http://www.xxx.co.jp/actionA.mp4" corresponding to the notified sub-address "91111" (Step S14). Next, the controller 31 determines whether the sub-address "91111" is within the period of validity and if it is within the period of validity (that is, if it is within 10 minutes of the issue time), then it accesses the CP server apparatus 20a using the obtained URL (Step S15). It should be noted that if the controller 31 determines that the period of validity of the sub-address has expired (that is, 10 minutes have passed from the issue time), then error notification screen data as shown in FIG. 9 is sent to the mobile phone 10a.

The controller 21a of the CP server apparatus 20a reads the content from the storage location indicated by the URL "http://www.xxx.co.jp/actionA.mp4" and sends the content to the relay apparatus 30 (Step S16). This content is sent from the relay apparatus 30 to the mobile phone 10a using the videophone protocol. The mobile phone 10a successively reproduces the content simultaneously while receiving it (Step S18).

In this manner, a streaming distribution of content from the CP server apparatus 20a via the relay apparatus 30 to the mobile phone 10a is possible.

With the above-described first embodiment, the mobile phone issues a new sub-address at the timing when the mobile phone requests a content from the CP server apparatus, that is, at the timing when the sub-address becomes necessary, and the specified content is distributed to the mobile phone with this sub-address. Subsequently, this cycle is repeated every time that a content is requested. Thus, it is possible to use the same sub-address multiple times for different content items, and it becomes possible to avoid increasing the number of digits of the sub-address or complicating the configuration of the sub-address, even when the number of content types or content items increases.

Moreover, in the first embodiment, the sub-address is provided with a period of validity. Thus, it is possible to remove content requests using sub-addresses whose period of validity has expired, and to process only content requests whose urgency for the user of the mobile phone appears to be high. Furthermore, an upper limit of the number of sub-addresses that can be issued for one URL is provided, so that it can be prevented that too many sub-addresses are issued for one URL. Thus, for example a spam attack in which an unauthorized access to a specific CP server apparatus is repeated can be averted without issuing useless sub-addresses.

(2) Second Embodiment

Figure 10:
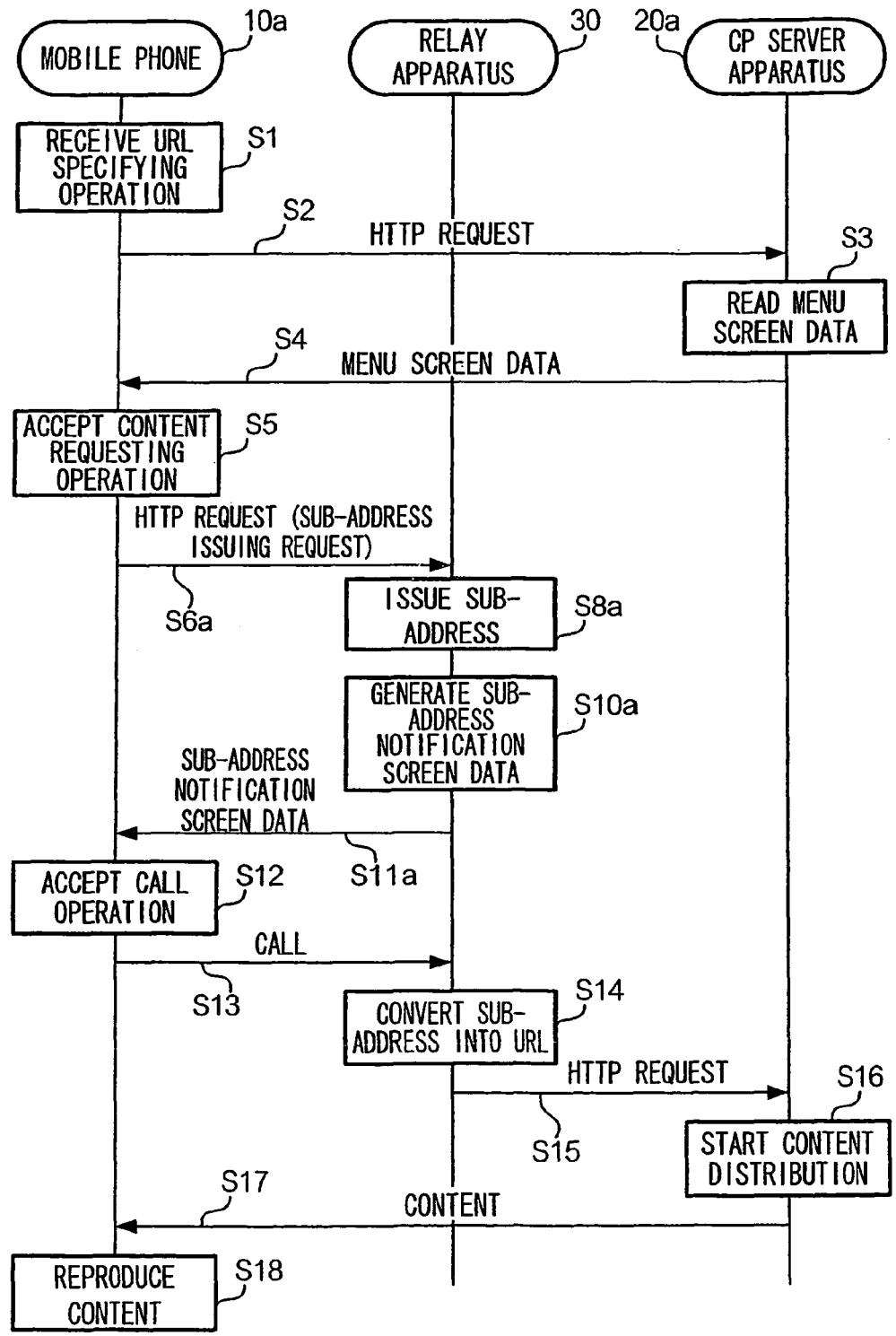
FIG. 10 is a sequence diagram showing the operation of the overall system according to a second embodiment of the present invention.

The second embodiment explained in the following differs from the first embodiment in that the Steps S6a to S11a shown in FIG. 10 are performed instead of the Steps S6 to S11 shown in FIG. 5.

Referring to FIG. 10, the following is an explanation of the operation of the second embodiment.

The mobile phone 10a displays the menu screen data shown in FIG. 6 on its display. When the user of the mobile phone 10a performs an operation to select the character string "Action A" shown in FIG. 6, the mobile phone 10a accepts this operation as a content request operation (Step S5) and sends out an HTTP request including the associated URL as a sub-address issue request (Step S6a). This URL is a URL assigned to the relay device 30, and contains the URL "http://www.xxx.co.jp/actionA.mp4" indicating the storage location of the content as a CGI parameter.

When the communication unit 32 of the relay apparatus 30 receives this HTTP request, the controller 31 writes the URL "http://www.xxx.co.jp/actionA.mp4" serving as the CGI parameter into the address conversion table, and writes the sub-address "91111" issued in accordance with a predetermined algorithm together with the issue time "2004/10/10 10:00" into the address conversion table in association with this URL (Step S8a). It should be noted that if the URL "http://www.xxx.co.jp/actionA.mp4" has already been written into the address conversion table, the controller 31 only need to write the issued sub-address and the issue time in association with this URL. In this case, if there is a sub-address whose period of validity has expired, then this sub-address and the issue time may be overwritten with a newly issued sub-address and its issue time. Also, if the upper limit of 100 sub-addresses has already been issued for the URL "http://www.xxx.co.jp/actionA.mp4" and if all these sub-addresses are within the period of validity, then the controller 31 notifies the mobile phone 10a of the fact that no sub-address can be issued.

Then, the controller 31 generates sub-address notification screen data (see FIG. 7) including the issued sub-address (Step S10a), and sends this data as an HTTP response from the communication unit 32 to the mobile phone 10a (Step S11a). The remaining process is the same as in FIG. 5.

With this second embodiment, the same effects as with the first embodiment are achieved. Furthermore, as can be easily seen by comparing FIG. 5 with FIG. 10, it becomes possible to reduce the communication traffic between the relay apparatus 30 and the CP server apparatuses 20a and 20b.

(3) Modification Examples

The present invention is not limited to the above-described embodiments, and for example the following modifications are possible.

(3-1) Modification Example 1

It is also possible to vary the upper limit of the sub-addresses that can be issued for the URL of given content, depending on the access frequency of the content. That is to say, it is also possible that an upper limit for each URL is stored in the non-volatile storage unit 33 of the relay apparatus 30, and the controller 31 counts the number of accesses to each of those URLs, while updating this upper limit for each URL in accordance with the number of accesses that are counted. Thus, it is possible to issue sub-addresses in accordance with the access situation, such that for a URL (or content) that is accessed many times for example, it is possible to respond to the need that the content is accessed by many users by increasing the upper limit, whereas for a URL that is accessed less, the sub-addresses can be effectively utilized by decreasing the upper limit.

(3-2) Modification Example 2

It is possible that as a consequence of more users trying to access a content provider's content, that content provider will possibly try to requests the relay apparatus 30 to issue sub-addresses exceeding the predetermined upper limit. Since in the above-described embodiments the upper limit of the sub-addresses is set for each URL individually, it is possible in practice to issue a number of sub-addresses exceeding the upper limit for the same content by changing the storage location of the content (i.e. the URL) in the CP server apparatus as suitable. To avoid such a wrongdoing with regard to the storage location, content provider described above, it is possible to set the upper limit by using the IP address instead of the URL as the communication address. Accordingly, even when there is a sub-address issue request for content whose URL has been changed, as long as the IP address is the same, the relay apparatus 30 can issue sub-addresses such that the upper limit for that content is not exceeded. Thus, it becomes possible to prevent the issuing of more sub-addresses than the upper limit by changing the URL. However, due to the configuration of websites, it may occur that there are content providers providing a plurality of content items over the same IP address. Therefore, it is also possible that the network provider and the content provider agree on which basis, namely the URL or the IP address of the content, the upper limit should be set, for example in view of the configuration of the website.

(3-3) Modification Example 3

In the foregoing examples, only one period is set for the periods of validity of the sub-addresses, but it is also possible to set different periods of validity for the URLs. For example, if the content is news or the like, it can be expected that the frequency with which the content is accessed decreases as time passes, so that setting a period of validity that is too long creates the possibility that it will not be sufficiently utilized. And if the content is created for the purpose of advertising, it can be expected that the content provider will want to make the period of validity as long as possible. Accordingly, if the periods of validity are set in accordance with the type and particulars of the content, it becomes possible to respond to those needs.

Furthermore, it is also possible to set different periods of validity for each content provider. For example, it may happen that processing errors occur repeatedly in the CP server apparatus when there are many accesses for content within a short period of time. And the case may occur that the period of validity of a sub-address expires while there are such repeated processing errors, so that as a result, the content cannot be accessed from the mobile phone. Accordingly, if there is a high possibility of such processing errors (for example, in cases where content that enjoys high popularity among users and for which there are many accesses is stored on the CP server apparatus, or in cases where the processing capability of the CP server apparatus is poor and the CP server apparatus cannot handle a large number of accesses), it is possible to extend the period of validity of sub-addresses for the content stored in that CP server apparatus. Moreover, if a mobile phone cannot access content due to a processing error in the CP server apparatus, it is possible that this fact is reported by either the network provider or the content provider, and the period of validity of the sub-address is extended.

(3-4) Modification Example 4

Among contents for targeted at adults, there is also contents whose distribution to children is not desirable. Accordingly, when the controller 31 of the relay apparatus 30 is notified of the telephone number of the mobile phone through a sender number notification function of the mobile phone network 100 in Step S13 of FIGS. 5, 10, the user attributes (for example, whether the user is an adult or a child) can be specified by looking up that telephone number in a predetermined user database. Moreover, the controller 31 stores the attributes of the content (for example, whether the content is for adults), and if the user attributes and the content attributes do not match, then the content request is denied, and this fact is notified to the mobile phone. In this embodiment, it can be prevented from the outset the content that is not suitable for the user is distributed.

(3-5) Modification Example 5

The telephone to which the content is distributed is not necessarily a mobile phone, but can also be a fixed telephone, as long as it is a telephone that supports the videophone protocol. Furthermore, the CP server apparatus and the relay apparatus do not necessarily be configured as separate apparatuses, but can also be configured as a plurality of apparatus groups. It should be noted that it is desirable that the content includes both video and audio, but there is no limitation to this, and it may also be content that includes only one of these.

(3-6) Modification Example 6

The computer program that is executed by the relay apparatus and the CP apparatus can be provided recorded on a recording medium, such as a magnetic tape, a magnetic disk, a floppy disk (registered trademark), an optical recording medium, an optomagnetic recording medium, a CD (Compact Disk), a DVD (Digital Versatile Disk), a RAM or the like.

(3-7) Modification Example 7

In the above-described embodiments, the relay apparatus 30 not only issues the sub-addresses by executing an address management program that is stored in the non-volatile storage unit 33, but also sends the content that has been obtained from the CP server apparatus 20a and 20b, by executing a content distribution program, to the mobile phones 10a and 10b using the videophone protocol. However, there are cases where the content distribution program cannot be executed properly due to such problems as a system error or defect in the relay apparatus 30, and thus the content that the relay apparatus 30 obtains from the CP server apparatuses 20a and 20b cannot be sent to the mobile phones 10a and 10b. It is not desirable that sub-addresses are issued and notified to the mobile phones 10a and 10b even in such a case where a content cannot be distributed. Accordingly, a configuration is also possible in which the relay apparatus determines whether the processing for obtaining content from the CP server apparatuses 20a and 20b and sending it by the videophone protocol to the mobile phones 10a and 10b is possible, and the processes of issuing and notifying sub-addresses are executed based on the result of the determination. That is to say, if the relay apparatus has determined that it cannot execute the process of sending content, then no sub-addresses are issued. Alternatively, the relay apparatus may issue sub-addresses, but not notify them to the mobile phones 10a and 10b. The following is detailed explanation of this approach.

Figure 11:
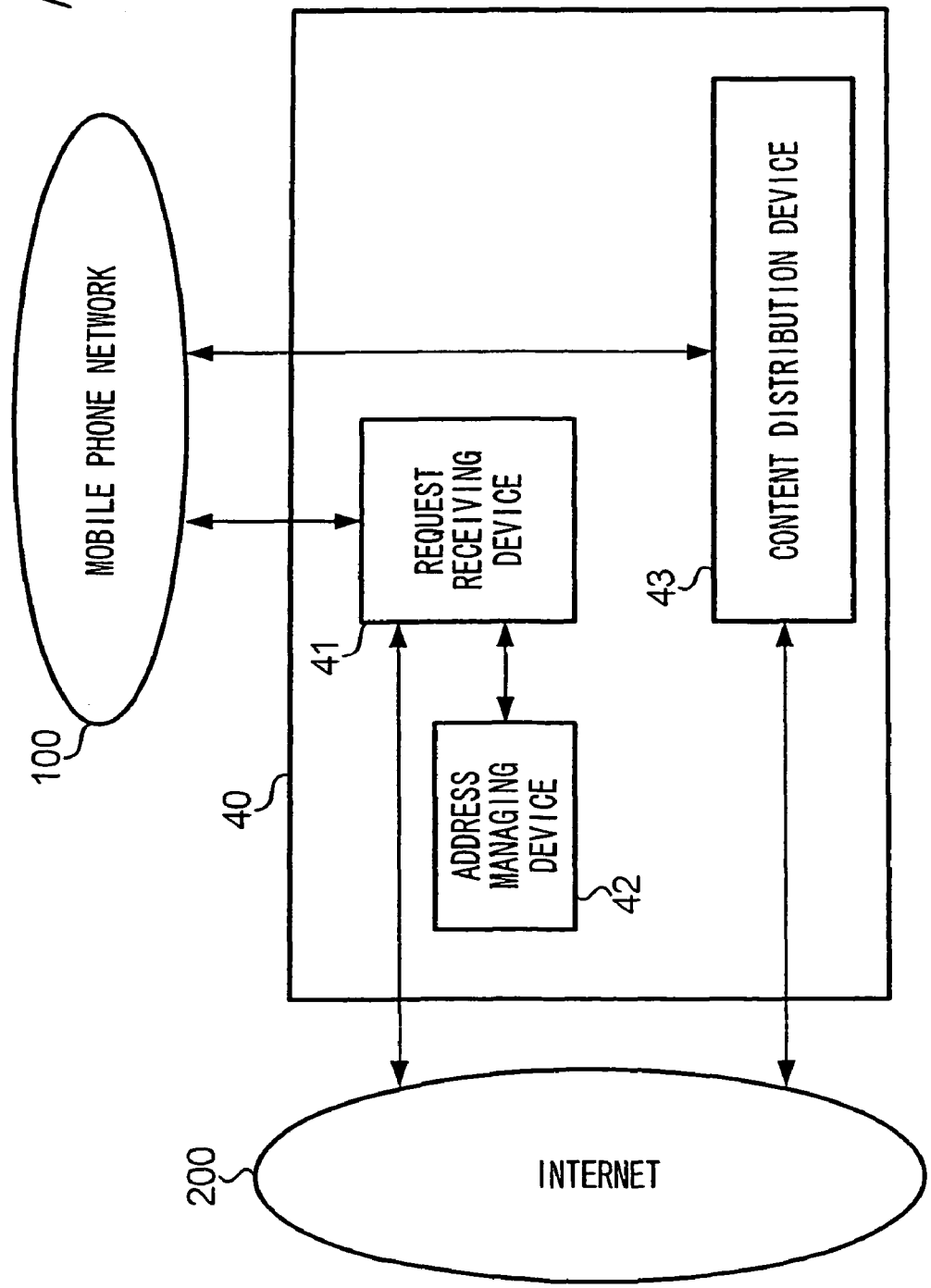
FIG. 11 is a block diagram showing the configuration of a relay apparatus according to a modified example.

FIG. 11 is a diagram showing an example of the configuration of a relay apparatus 40 according to this modified example. As shown in FIG. 11, the relay apparatus 40 includes a request receiving device 41, an address managing device 42 and a content distribution device 43. The request receiving device 41 is provided with a function for receiving sub-address issuing requests from the mobile phones 10a and 10b. The address managing device 42 handles the processing for issuing sub-addresses. The content distribution device 43 handles the processing for the distribution of content. The request receiving device 41 and the content distribution device 43 are both connected to the mobile phone network 100 and the Internet 200 shown in FIG. 1. Furthermore, the address conversion table shown by way of example in FIG. 3 is stored in the address managing device 42.

Figure 12:
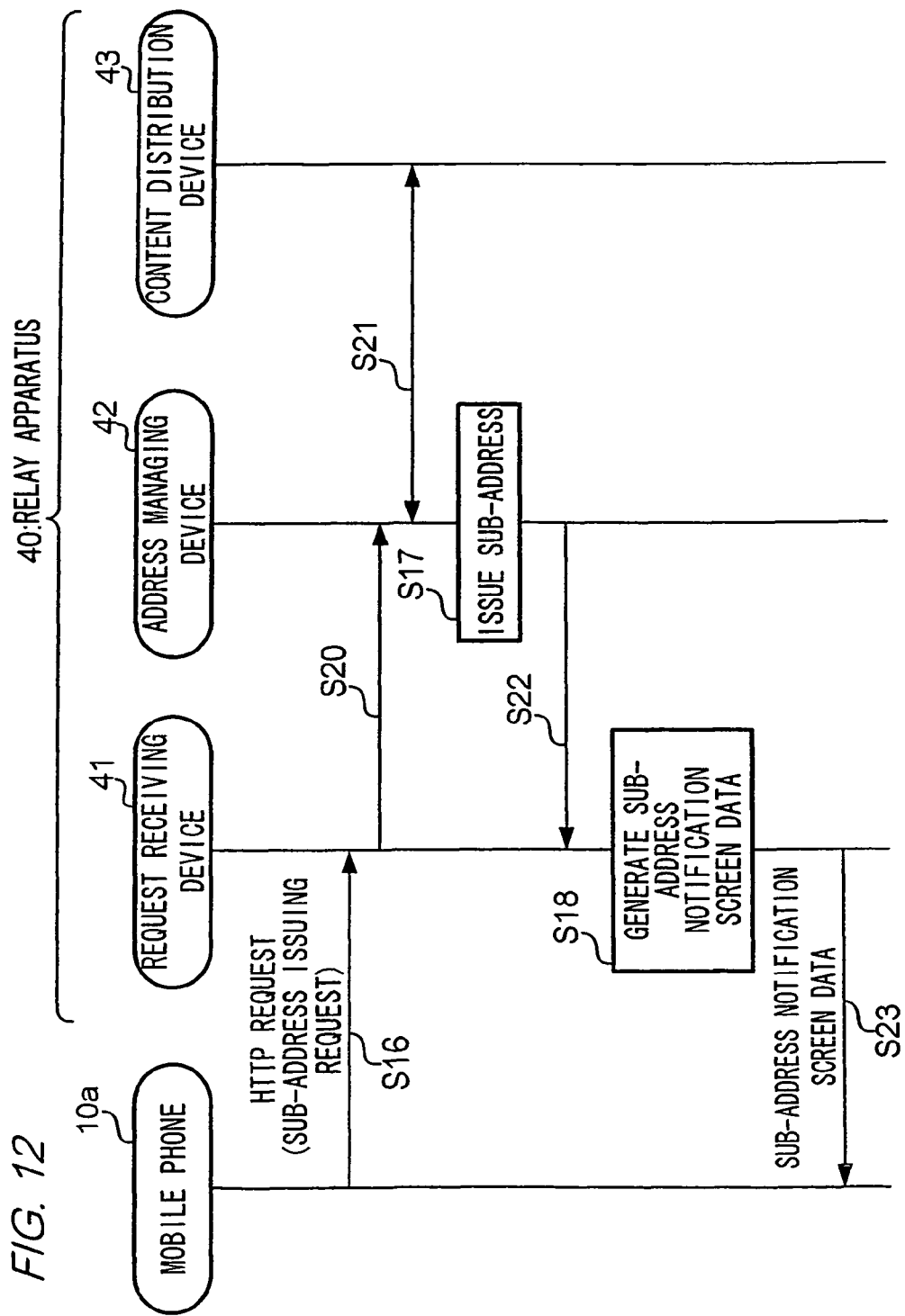
FIG. 12 is a sequence diagram showing the operation of the overall system in this modified example.
Figure 13:
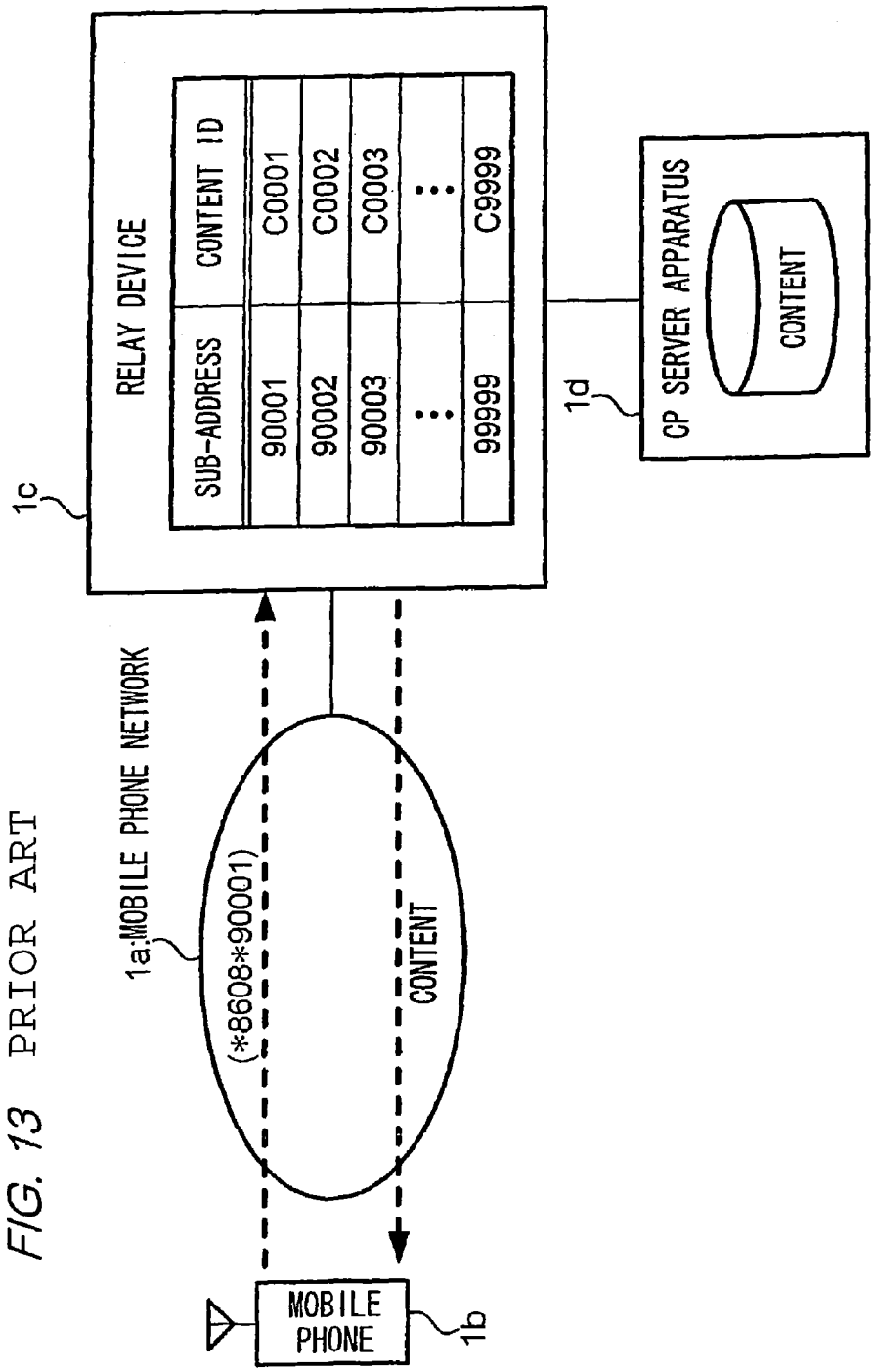
FIG. 13 is a diagram illustrating the prior art.

FIG. 12 is a sequence diagram showing the operation of the overall system according to this modified example. Following Step S5 in FIG. 10, the operation shown in FIG. 12 is started. It should be noted that in FIG. 12, the same operations as in FIG. 10 are denoted by the same numerals.

The mobile phone 10a sends, as a sub-address issuing request, an HTTP request including the URL "http://www.xxx.co.jp/actionA.mp4" associated with the character string "Action A" that has been selected by the user in the screen shown by way of example in FIG. 6 (Step S16). This HTTP request is received by the request receiving device 41, through the mobile phone network 100. When the request receiving device 41 receives this HTTP request (sub-address issuing request), it notifies the address managing device 42 of the URL "http://www.xxx.co.jp/actionA.mp4", and asks it for the issuing of a sub-address (Step S20). The address managing device 42 confirms the presence of the content distribution device 43, either constantly or every time it is asked to issue a sub-address (Step S21). More specifically, the address managing device 42 periodically sends a confirmation message to the content distribution device 43, and if the content distribution device 43 responds to this message, then it determines that the content distribution device 43 operates properly (that is, it is possible to obtain content from the CP server apparatuses 20*a*, 20*b* and to send the content by videophone protocol to the mobile phones 10*a*, 10*b*). On the other hand, if the content distribution device 43 does not respond to the confirmation message, then the address managing device 42 determines that the content distribution device 43 does not operate properly (that is, that it is not possible to obtain content from the CP server apparatuses 20*a*, 20*b* and to send the content by videophone protocol to the mobile phones 10*a*, 10*b*). If it is determined that the content distribution device 43 does not operate properly, then the address managing device 42 transmits this fact to the request receiving device 41, and the request receiving device 41 sends a message indicating that "the sub-address cannot be issued due to problems in the system" to the mobile phone 10*a*. When the user sees this message, the user will know that the content cannot be obtained.

In FIG. 12, it is assumed that it has already been confirmed by the confirmation with the address managing device 42 that the content distribution device 43 operates properly. If it has thus been confirmed that the content distribution device 43 operates properly, then the address managing device 42 issues a sub-address (Step S17). That is to say, the address managing device 42 writes the above-noted URL into the address conversion table, and writes a sub-address issued in accordance with a predetermined algorithm together with the issue time into the address conversion table in association with this URL. It should be noted that if the same URL has already been written into the address conversion table, then it is sufficient, as in the above-described embodiment, that the address managing device 42 writes the issued sub-address and the issue time in association with the URL. Furthermore, if there is a sub-address whose valid time has expired, then the address managing device 42 can delete this sub-address from the address conversion table. Moreover, if sub-addresses up to the upper limit have already been issued for the URL and all these sub-addresses are within the valid time, then the address managing device 42 may transmit the fact that a sub-address cannot be issued to the request receiving device 41, and the request receiving device 41 may notify the mobile phone 10*a* of this fact.

Furthermore, the address managing device 42 notifies the request receiving device 41 of the issued sub-address (Step S22). The request receiving device 41 creates sub-address notification screen data including the notified sub-address (Step, S18), and sends this data as an HTTP response to the mobile phone 10*a* (Step S23). After this, the same operation as from Step S12 in FIG. 10 is carried out.

It should be noted that in the foregoing modified examples, an example was explained in which no sub-address was issued at all if the content distribution device 43 does not operate properly, but instead it is also possible to issue a sub-address, but not to notify the issued sub-address to the mobile phone.

With the above modified example, it is possible to eliminate the workload of issuing a sub-address and notifying it, if it is not possible to execute the processing of obtaining content from the CP server apparatuses 20*a*, 20*b* and sending the content by videophone protocol to the mobile phones 10*a*, 10*b*.

What is claimed is:

1. A relay apparatus comprising:
   a videophone unit configured to communicate with a mobile telephone using a videophone protocol for sending and receiving video and audio in synchronization;
   a communication unit configured to communicate data with a content server, wherein the content server is configured to store a content;
   a memory;
   a processor in communication with the videophone unit, the communication unit, and the memory, and
   the processor is configured to dynamically select and assign a dynamic sub-address in response to receipt of a request from the content server to issue a sub-address, wherein the request includes a communication address indicating a storage location of the content, and the processor is further configured to write the dynamic sub-address selected and assigned by the processor into the memory in association with the communication address, wherein the dynamic sub-address specifies the content including at least one of a video content and an audio content;
   the processor is further configured, in further response to the request, to send the dynamic sub-address stored in the memory to the content server;
   the processor is further configured, in response to receipt by the videophone unit of a call-connect signal including the dynamic sub-address, to control the communication unit to access the content stored on the content server as a function of the communication address stored in association with the dynamic sub-address, wherein the call-connect signal is sent by the mobile telephone; and
   the processor is further configured, in response to receipt of the content from the content server, to send, via the videophone unit, the content received from the content server to the mobile telephone.

2. The relay apparatus according to claim 1, wherein to access the content stored on the content server, the processor is further configured to determine whether the dynamic sub-address included in the call-connection signal is within a period of validity; and
   in response to determination that the dynamic sub-address is within the period of validity, the processor is further configured to retrieve the communication address stored in association with the dynamic sub-address from the memory as a function of the dynamic sub-address.

3. The relay apparatus according to claim 1, wherein to dynamically select and assign the dynamic sub-address, the processor is configured to permit storage of up to a maximum number of dynamic sub-addresses in association with the communication address stored in the memory; and
   wherein the processor is further configured to select and assign up to the maximum number of dynamic sub-addresses in association with the communication address.

4. The relay apparatus according to claim 3, wherein in response to determination that the memory contains the maximum number of dynamic sub-addresses stored in association with the communication address, the processor is further configured to reject the request.

5. The relay apparatus according to claim 1, wherein the dynamic sub-address is a first dynamic sub-address, and the memory is configured to store a plurality of dynamic sub-addresses including the first dynamic sub-address in association with the communication address; and in response to an expiration of validity of one of the plurality of dynamic sub-addresses stored in association with the communication address, the processor is further configured to invalidate the one of the plurality of dynamic sub-addresses stored in association with the communication address, and update a sub-address count.

6. The relay apparatus according to claim 1, wherein:

the processor is further configured to permit storage of up to a maximum number of dynamic sub-addresses in association with the communication address in the memory; and wherein the processor maintains a sub-address count of a current number of dynamic sub-addresses stored in the memory in association with the communication address; and in response to termination of the call-connect signal, the processor is further configured to invalidate the dynamic sub-address contained in the call-connect signal and update the sub-address count.

7. A relay apparatus comprising:

a memory;

a videophone unit configured to communicate with a mobile telephone as a function of a videophone protocol for sending and receiving video and audio in synchronization;

a communication unit configured to communicate with the mobile telephone and a server corresponding to a communication address;

a processor in communication with the videophone unit, the communication unit, and the memory, the processor configured to dynamically select and assign a sub-address to a content, the sub-address dynamically selected and assigned to the content in response to receipt of a request from the mobile telephone for issuance of the sub-address, wherein the content includes at least one of a video content and an audio content and is stored at a storage location associated with the communication address;

the processor is further configured to store the sub-address, selected and assigned by the processor, in association with the communication address;

via the communication unit, the processor is further configured to notify the mobile telephone of the sub-address corresponding to the content;

the processor is further configured, in response to receipt, from the mobile telephone, of a call-connection signal including the sub-address corresponding to the content, to retrieve the communication address stored in the memory based upon the sub-address, and further configured to retrieve, from the server, the content corresponding to the sub-address based upon the communication address stored in association with the sub-address; and the processor further configured to send the content from the server to the mobile telephone.

8. The relay apparatus according to claim 7, wherein to retrieve the communication address based upon the sub-address, the processor is further configured to determine whether the sub-address included in the call-connection signal is within a period of validity; and the processor, in response to determination that the sub-address is within the period of validity, is further configured to send a content request to the server.

9. The relay apparatus according to claim 8, wherein in response to determination that the sub-address is outside the period of validity, the processor is further configured to send an error notification to the mobile telephone.

10. The relay apparatus according to claim 7, wherein the sub-address selected and assigned by the processor is a first sub-address;

the memory is configured to store a plurality of sub-addresses in association with the communication address, and the plurality of sub-addresses includes the first sub-address; and wherein the processor is further configured to permit only up to a maximum number of sub-addresses to be stored in association with the communication address.

11. The relay apparatus according to claim 10, wherein in further response to receipt of the request, the processor is further configured to determine whether the memory already contains the maximum number of sub-addresses associated with the communication address; and in response to determination that the memory already contains the maximum number of sub-addresses associated with the communication address, the processor rejects the request.

12. The relay apparatus according to claim 10, wherein:

the processor is further configured to count a number of accesses to the communication address; and the processor is further configured to adjust the maximum number of sub-addresses permitted to be associated with the communication address based upon the number of accesses to the communication address.

13. A content distribution method in a system including a mobile telephone, a relay apparatus and a content server, the content distribution method comprising:

the content server notifying the relay apparatus of a communication address indicating a storage location of a content, the content including at least one of a video content and an audio content;

at the relay apparatus, dynamically issuing and assigning to the content a dynamic sub-address that specifies the content;

storing, at the relay apparatus, the dynamic sub-address in association with the communication address;

in further response to issuance and assignment of the dynamic sub-address, transmitting the dynamic sub-address from the relay apparatus to the content server;

receiving, at the relay apparatus, a call connection signal from the mobile telephone, the call-connection signal including the dynamic sub-address;

in response to receipt of the call-connection signal, obtaining, with the relay apparatus, the content from the storage location based upon the communication address stored in association with the dynamic sub-address at the relay apparatus; and sending the content with a videophone protocol from the relay apparatus to the mobile telephone.

14. A content distribution method in a system provided with a mobile telephone, a relay server, and a content server, the content distribution method comprising:

receiving at the relay server, from the mobile telephone, a request for issuance and assignment of a sub-address to a content, the content including at least one of a video content and an audio content;

in response to receipt of the request for issuance and assignment of the sub-address, generating, at the relay server, a dynamic sub-address, wherein the dynamic sub-address specifies the content;

storing the dynamic sub-address at the relay server in association with a communication address, wherein the communication address identifies a storage location of the content;

in further response to receipt of the request, transmitting the dynamic sub-address from the relay server to the mobile telephone;

at the relay server, receiving, from the mobile telephone, a call-connection signal which includes a telephone number assigned to the relay server, and the dynamic sub-address;

in response to receipt of the call-connection signal, retrieving, with the relay server, the content from the content server based upon the communication address stored in association with the dynamic sub-address; and sending the content from the relay apparatus to the mobile telephone as a function of a videophone protocol.

15. The content distribution method according to claim 14, wherein before generating, at the relay server, the dynamic sub-address, the method further comprises:

at the relay server, determining whether a process to send the content via the videophone protocol to the mobile telephone is permitted; and in response to determination that the process to send the content via the videophone protocol is impermissible, at least one of:
- suspending generation of the dynamic sub-address by the relay server; and
- suspending transmission of the dynamic sub-address from the relay server.

* * * * *